(12) United States Patent
Nordstrom et al.

(10) Patent No.: US 8,564,157 B2
(45) Date of Patent: Oct. 22, 2013

(54) BATTERY PACK ACTIVE DISCHARGE INTEGRATION

(75) Inventors: Erik Charles Nordstrom, Troy, MI (US); Justin McKinney, Oxford, MI (US); Mehrdad Teimorzadeh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 462 days.

(21) Appl. No.: 13/010,834

(22) Filed: Jan. 21, 2011

(65) Prior Publication Data

US 2012/0187775 A1     Jul. 26, 2012

(51) Int. Cl.
*B23K 11/24* (2006.01)
*H02B 1/24* (2006.01)

(52) U.S. Cl.
USPC ........... 307/112; 307/116; 307/9.1; 307/10.1; 320/116; 320/127

(58) Field of Classification Search
None
See application file for complete search history.

(56) References Cited

U.S. PATENT DOCUMENTS

2011/0049977 A1*  3/2011  Onnerud et al. ............... 307/9.1

* cited by examiner

*Primary Examiner* — Jared Fureman
*Assistant Examiner* — Aqeel Bukhari
(74) *Attorney, Agent, or Firm* — Quinn Law Group, PLLC

(57) ABSTRACT

A discharge system includes a battery, an electrical power bus selectively connected to the battery, a module configured to receive electrical energy from the battery via the electrical power bus, and a discharge resistor selectively connected to the electrical power bus. A contactor is operatively disposed between the battery and the electrical power bus. The contactor is configured to selectively connect the electrical power bus to the battery or the discharge resistor. That is, the contactor is configured to connect the electrical power bus to the discharge resistor in a default mode to discharge electrical energy stored in the module, and the contactor is configured to connect the electrical power bus to the battery in at least one vehicle operating mode.

18 Claims, 2 Drawing Sheets

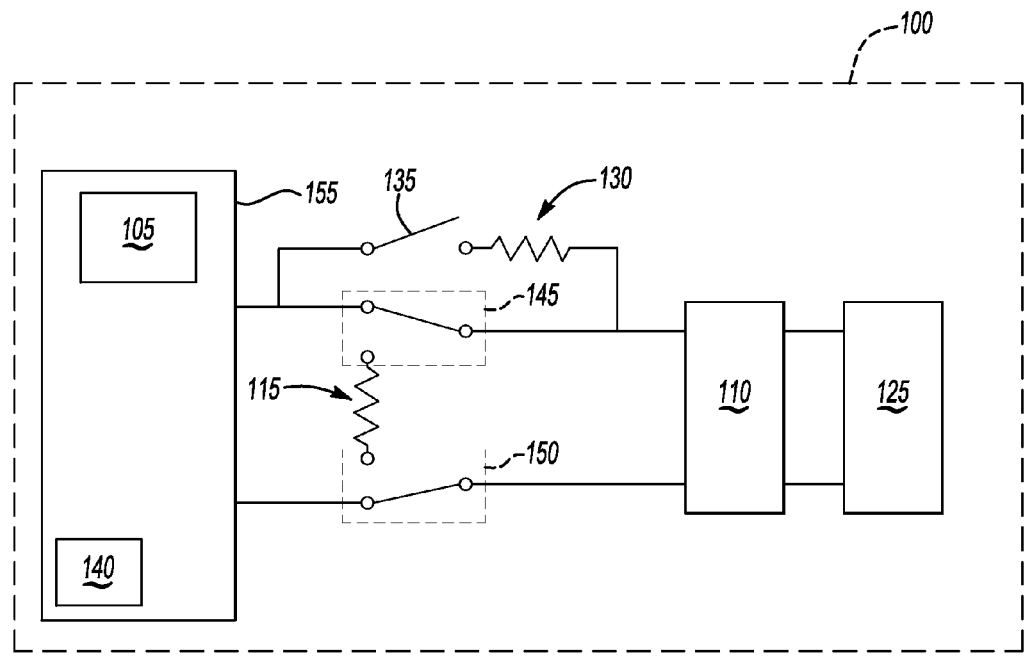
Fig-3
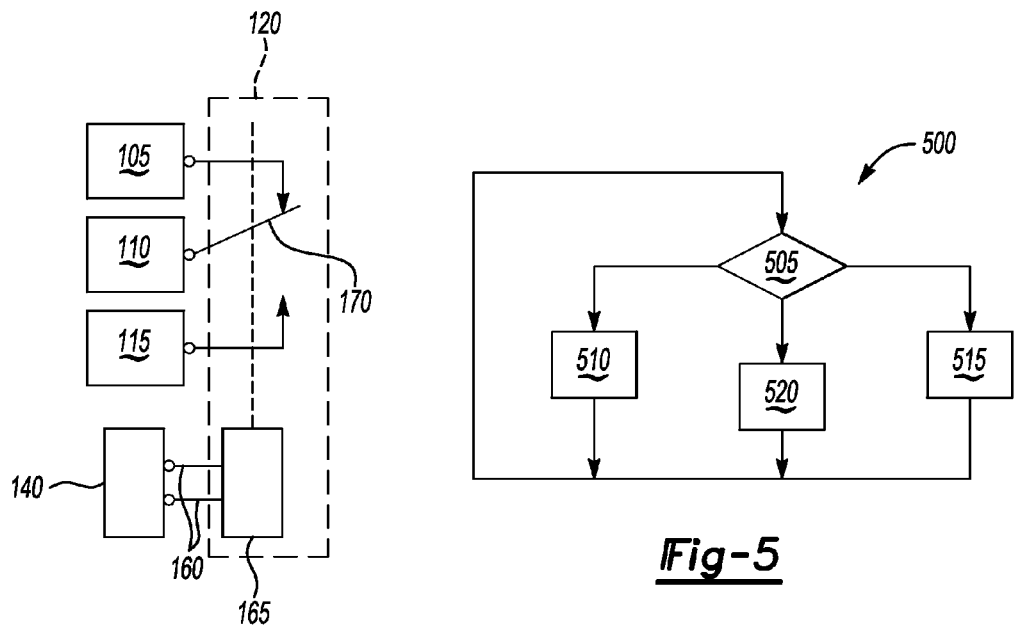
Fig-4
Fig-5

BATTERY PACK ACTIVE DISCHARGE INTEGRATION

TECHNICAL FIELD

The disclosure relates to actively discharging electrical energy stored in an electronic device in a vehicle.

BACKGROUND

Passenger and commercial vehicles may include various electronic devices that receive electrical energy from a battery. The battery may output direct current (DC) electrical energy that may be converted to another DC potential or to alternating current (AC) electrical energy. This way, the battery may support electronic devices that require a high voltage or a low voltage, as well as devices that operate using DC energy or AC energy, using a high, intermediate, or low voltage power bus connected to various modules, such as an inverter, a DC-DC converter, a charger, and other modules.

SUMMARY

An example discharge system includes a battery, a power bus selectively connected to the battery, at least one module configured to receive electrical energy from the battery via the electrical power bus, a discharge resistor selectively connected to the electrical power bus, and a first contactor operatively disposed between the battery and the electrical power bus. The first contactor is configured to selectively connect the electrical power bus to the battery or the discharge resistor. The first contactor is configured to connect the electrical power bus to the discharge resistor in a default mode to discharge electrical energy stored in the module. Further, the first contactor is configured to connect the electrical power bus to the battery in at least one vehicle operating mode.

BRIEF DESCRIPTION OF THE DRAWINGS

FIG. 3 illustrates a schematic diagram of an example circuit that may be used in a vehicle during a second operating mode of the vehicle.

FIG. 4 illustrates a schematic diagram of an example first and/or second contactor that may be used in the vehicle of FIGS. 1-3.

FIG. 5 illustrates an example process that may be implemented to control the circuits of FIGS. 1-3.

DETAILED DESCRIPTION

A discharge system that provides a less complex and more cost-effective way to discharge electrical energy across an electrical power bus and stored in one or more modules is described below. The discharge system may take many different forms and include multiple and/or alternate components and facilities. While an example discharge system is shown in the Figures, the components illustrated in the Figures are not intended to be limiting. Indeed, additional or alternative components and/or implementations may be used.

Figure 1:
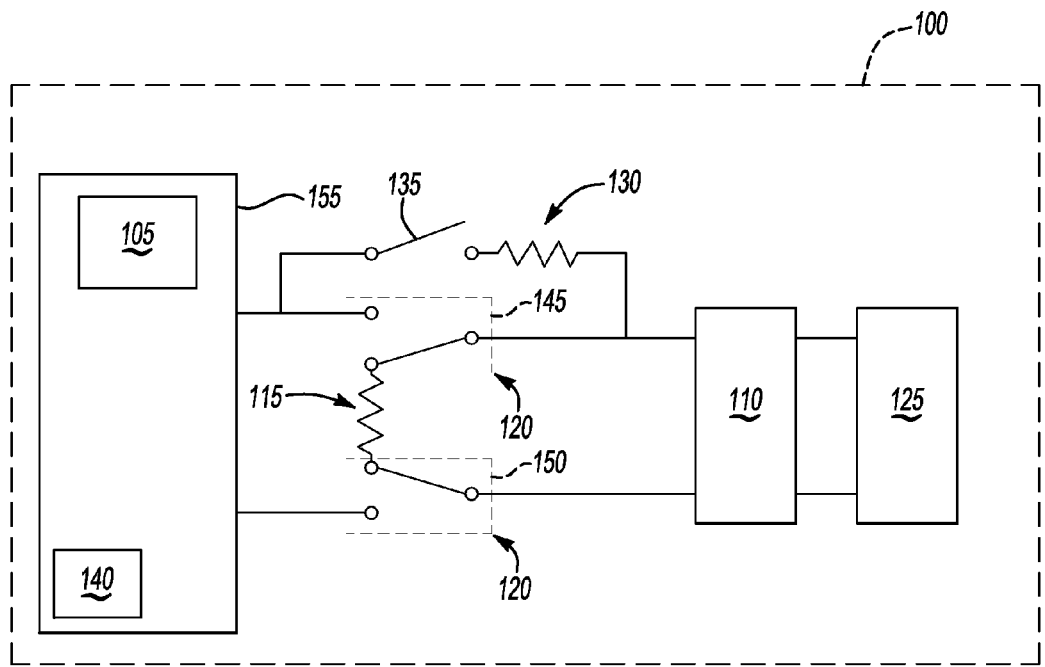
FIG. 1 illustrates a schematic diagram of an example circuit that may be used in a vehicle to discharge electrical energy across an electrical power bus and/or at least one module in a default mode.

FIG. 1 illustrates a discharge system 100 that may include one or more of a battery 105, an electrical power bus 110, a discharge resistor 115, at least one contactor 120, at least one module 125, a pre-charge resistor 130, a pre-charge contactor 135, and a controller 140. The discharge system 100 may be implemented in any passenger or commercial automobile such as a hybrid electric vehicle including a plug-in hybrid electric vehicle (PHEV) or an extended range electric vehicle (EREV), a gas-powered vehicle, a battery electric vehicle (BEV), or the like. The discharge system may additionally or alternatively be used in other applications besides a vehicle.

The battery 105 may include any device configured to store electrical energy and provide the electrical energy to one or more electronic devices. In one possible approach, the battery 105 may be configured to output direct current (DC) electrical energy at a predetermined voltage. Moreover, the battery 105 may include multiple batteries arranged in series or parallel to provide the electrical energy at the predetermined voltage.

The electrical power bus 110 is selectively connected to the battery 105 and may include any device configured to convert, for example, the DC electrical energy provided by the battery 105 to alternating current (AC) electrical energy or another type of electrical energy. In addition or alternatively, the electrical power bus 110 may be configured to increase or decrease the voltage output by the battery 105. This way, the electrical power bus 110 may be used to provide electrical energy to high and/or low voltage electronic devices that use AC energy or DC energy. The electrical power bus 110 may include any number of inverters, chargers, AC-DC converters, DC-DC converters, or any other high, intermediate, or low voltage device. The discharge system 100 may include any number of electrical power busses 110, and each electrical power bus 110 may provide electrical energy from the battery 105 to any number of modules 125.

The discharge resistor 115 may include any resistive element configured to dissipate electricity or power across one or more electrical devices, such as the electrical power bus 110 and/or one or more modules 125 as discussed below. The discharge resistor 115 may be formed from an element or compound that resists the flow of electricity, such as a nickel-chrome alloy. The discharge resistor 115 may further include a resistive film that resists the flow of electricity.

The at least one contactor 120 may include any device configured to selectively connect two electronic components. For example, one or both of the contactors 120 may be configured to connect the electrical power bus 110 to either the battery 105 or the discharge resistor 115 at any given time. As illustrated in FIG. 1, the discharge system 100 includes a first contactor 145 operatively disposed between the battery 105 and the electrical power bus 110 and configured to selectively connect the electrical power bus 110 to the battery 105 or the discharge resistor 115. The first contactor 145 may be configured to connect the electrical power bus 110 to the discharge resistor 115 in a default mode (e.g., a key-off mode) and connect the electrical power bus 110 to the battery 105 in at least one vehicle operating mode. A second contactor 150 may be operatively disposed between the battery 105 and the electrical power bus 110 and configured to selectively connect the electrical power bus 110 to the battery 105 or the discharge resistor 115. For instance, the second contactor 150 may be configured to connect the electrical power bus 110 to the discharge resistor 115 in the default mode and further connect the electrical power bus 110 to the battery 105 in one or more vehicle operating modes. In one possible approach, the first contactor 145, the second contactor 150, or both, may each include a multiple throw switch, such as a single pole double throw (SPDT) switch.

The module 125 may include any high, intermediate, or low voltage electronic device configured to carry out one or more functions in the vehicle using electrical energy received from the battery 105 during, e.g., a module active mode of the vehicle. The module 125 may include one or more of an accessory power module (APM), an air conditioning control module (ACCM), a charger module configured to charge the battery 105, a battery heater, or the like. As illustrated in FIG. 1, the modules 125 are each electrically coupled to the electrical power bus 110. In one possible approach, one or more of the modules 125, such as the APM, charger module, etc., may be connected directly to the battery 105.

The pre-charge resistor 130 may include any resistive element operatively disposed between the battery 105 and the electrical power bus 110. For instance, during a pre-charge operating mode, electrical energy from the battery 105 may be directed through the pre-charge resistor 130. The pre-charge resistor 130 may be configured to limit current flow from the battery 105 to the electrical power bus 110 at, for example, the instant when the battery 105 and electrical power bus 110 are electrically connected to one another. Thus, current may only be directed through the pre-charge resistor 130 for a short amount of time such as only during the pre-charge operating mode of the vehicle.

The pre-charge contactor 135 may include any device configured to selectively connect the battery 105 to the electrical power bus 110 during, for instance, the pre-charge operating mode of the vehicle. Accordingly, the pre-charge contactor 135 may be operatively disposed between the battery 105 and the electrical power bus 110. In one example approach, the pre-charge contactor 135 may include a single throw switch.

The controller 140 may include any device configured to actuate the first contactor 145, the second contactor 150, or both, to selectively connect the electrical power bus 110 to the battery 105 or the discharge resistor 115. For instance, the controller 140 may be configured to actuate the first contactor 145 and the second contactor 150 to connect the electrical power bus 110 to the discharge resistor 115 during a default operating mode of the vehicle. The default operating mode may occur any time the vehicle is turned off. In one possible approach, the controller 140 or another computing device (not shown) may detect a key-off event (e.g., when the driver of the vehicle turns the key to the "off" position). Upon detection of the key-off event, the controller 140 may cause the first contactor 145 and the second contactor 150 to connect the electrical power bus 110 to the discharge resistor 115.

During other operating modes of the vehicle, such as during a pre-charge mode or a module active mode, the controller 140 may be configured to control the first and second contactor 150 in other ways. For example, referring to FIG. 2, during the pre-charge mode, the controller 140 may be configured to cause the pre-charge contactor 135 to actuate to connect the electrical power bus 110 to the battery 105 while diverting current from the battery 105 through the pre-charge resistor 130. Moreover, during the pre-charge mode, the controller 140 may actuate the second contactor 150 to connect the electrical power bus 110 to the battery 105. During the module active mode, as illustrated in FIG. 3, the controller 140 may actuate the first contactor 145 and the second contactor 150 to connect the electrical power bus 110 to the battery 105, while actuating the pre-charge contactor 135 so that no current is diverted through the pre-charge resistor 130.

In one possible approach, the controller 140 may include a vehicle integration control module (VICM) configured to communicate with other computing devices within the vehicle, such as a hybrid control processor, an engine control module, a transmission control module, and/or a motor control module. The controller 140 may be packaged with the battery 105 as part of a battery pack 155.

In general, computing systems and/or devices, such as the controller 140, etc., may generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

FIG. 4 illustrates a schematic diagram of an example single pole double throw switch that may be used to implement the contactor 120, such as the first contactor 145, the second contactor 150, or both. The switch may include leads 160, a coil 165, and a switching element 170. In one possible approach, the controller 140 may control the operation of the switching element 170 by providing electrical energy to the leads 160 of the coil 165. As the current passes through the coil 165, a magnetic field is generated that may act upon the switching element 170, thus causing the switching element 170 to electrically connect the electrical power bus 110 to either the battery 105 or the discharge resistor 115. The switching element 170 may be configured to connect the electrical power bus 110 to the discharge resistor 115 when no electrical energy is provided to the leads 160 of the coil 165, such as during a default mode of the vehicle (e.g., following a key-off event). However, when electrical energy is provided to the coil 165, the magnetic field may either push or pull the switching element 170 to a position that electrically connects the electrical power bus 110 to the battery 105.

Figure 2:
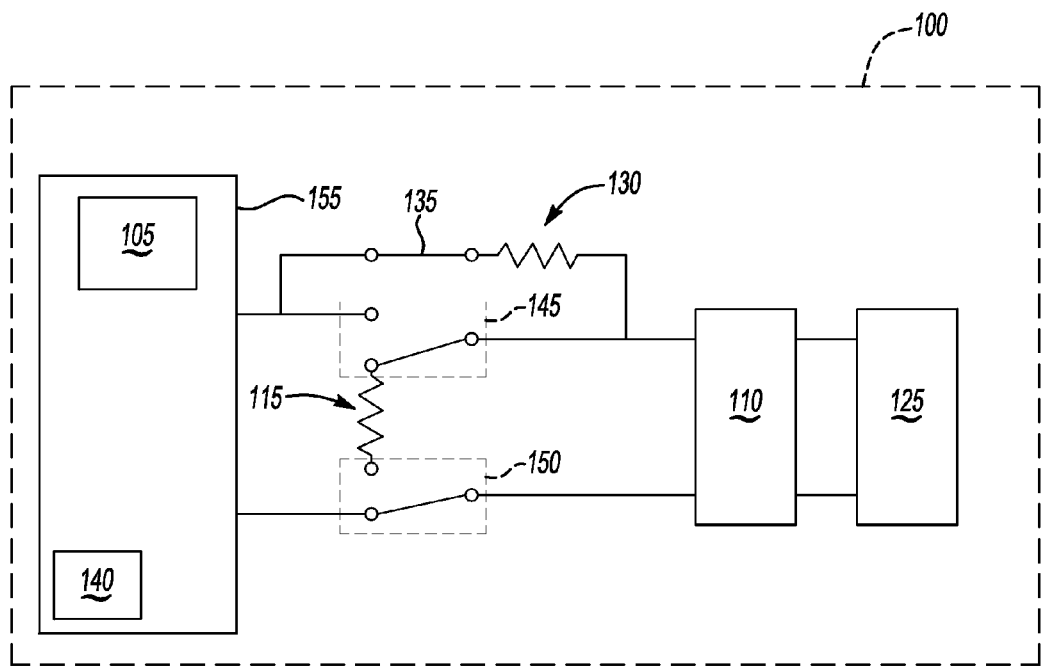
FIG. 2 illustrates a schematic diagram of an example circuit that may be used in a vehicle during a first operating mode of the vehicle.

FIG. 5 illustrates an example process 500 that may be used to control the operation of the circuits illustrated in FIGS. 1-3.

At decision block 505, the controller 140 or another computing device may detect the operating mode of the vehicle. For instance, the controller 140 or another computing device may detect a key-off event (e.g., the driver turning the key to an "off" position), which may indicate the driver's intention to turn off the vehicle. Doing so may indicate to the controller 140 that the vehicle is in the default mode. When in the default mode, the process 500 may continue at block 510. If a pre-charge is commanded (e.g., to enable one or more of the modules 125), the controller 140 may determine that the vehicle is in the pre-charge mode, at least with respect to the module 125 about to be enabled. When the controller 140 determines that the vehicle is operating in the pre-charge mode, the process 500 may continue at block 515. If a module 125 is enabled and receiving electrical energy, the controller 140 may determine that the vehicle is operating in the module active mode at least with respect to the enabled module 125. In one possible implementation, the module active mode may occur automatically after a predetermined amount of time has elapsed since the beginning of the pre-charge mode. During the module active mode, the process 500 may continue at block 520.

At block 510, the controller 140 may actuate the first contactor 145 and the second contactor 150 to electrically connect the electrical power bus 110 to the discharge resistor 115. In one possible implementation, the first contactor 145 and the second contactor 150 are configured to default to a position that electrically connects the electrical power bus 110 to the discharge resistor 115. When in the default mode, such as when the vehicle is off, the discharge resistor 115 may dissipate any electrical energy across the electrical power bus 110 and/or one or more of the modules 125. The process 500 may continue at block 505.

At block 515, the controller 140 may actuate the second contactor 150 to electrically connect the electrical power bus 110 to the battery 105 and actuate the pre-charge contactor 135 to divert electrical energy from the battery 105 to the electrical power bus 110 through the pre-charge resistor 130. Doing so my prevent the electrical power bus 110 and one or more of the modules 125 from receiving an excess amount of current at the instant the electrical power bus 110 and/or modules 125 receives electrical energy from the battery 105. After block 515, the process 500 may continue with block 505 or with block 520.

At block 520, the controller 140 may actuate the first contactor 145 and the second contactor 150 to electrically connect the electrical power bus 110 to the battery 105. This way, the battery 105 may provide electrical energy to the electrical power bus 110 and/or one or more of the modules 125. After block 520, the process 500 may continue at block 505.

While the best modes for carrying out the invention have been described in detail, those familiar with the art to which this invention relates will recognize various alternative designs and embodiments for practicing the invention within the scope of the appended claims.

The invention claimed is:

1. A discharge system comprising:
a battery;
an electrical power bus selectively connected to the battery;
at least one module configured to receive electrical energy from the battery via the electrical power bus;
a discharge resistor selectively connected to the electrical power bus; and
a first contactor operatively disposed between the battery and the electrical power bus and configured to selectively connect the electrical power bus to the battery or the discharge resistor, wherein the first contactor is configured to connect the electrical power bus to the discharge resistor in a default mode to discharge electrical energy stored in the module, and wherein the first contactor is configured to connect the electrical power bus to the battery in at least one vehicle operating mode.

2. A discharge system as set forth in claim 1, further comprising a second contactor operatively disposed between the battery and the electrical power bus and configured to selectively connect the electrical power bus to the battery or the discharge resistor.

3. A discharge system as set forth in claim 2, wherein the second contactor is configured to connect the electrical power bus to the discharge resistor in the default mode and connect the electrical power bus to the battery in at least one vehicle operating mode.

4. A discharge system as set forth in claim 3, wherein at least one of the first contactor and the second contactor includes a single pole double throw switch.

5. A discharge system as set forth in claim 3, wherein at least one of the first contactor and the second contactor includes a multiple throw switch.

6. A discharge system as set forth in claim 1, further comprising a controller configured to actuate the first contactor to selectively connect the electrical power bus to the battery or the discharge resistor.

7. A discharge system as set forth in claim 6, further comprising a second contactor operatively disposed between the battery and the electrical power bus and configured to selectively connect the electrical power bus to the battery or the discharge resistor, and wherein the controller is further configured to actuate the second contactor to selectively connect the electrical power bus to the battery or the discharge resistor.

8. A discharge system as set forth in claim 1, further comprising a pre-charge resistor operatively disposed between the battery and the electrical power bus.

9. A discharge system as set forth in claim 8, further comprising a pre-charge contactor operatively disposed between the battery and the electrical power bus and configured to selectively connect the battery and the electrical power bus to the pre-charge resistor.

10. A discharge system as set forth in claim 1, wherein the at least one module includes a plurality of modules, each in communication with the electrical power bus and configured to receive electrical energy from the battery.

11. A discharge system as set forth in claim 10, wherein the discharge resistor is configured to be selectively coupled to the electrical power bus to dissipate electrical energy stored in each of the modules.

12. A discharge system comprising:
at least one battery configured to store electrical energy;
a discharge resistor configured to discharge electrical energy stored in at least one module that receives electrical energy from the battery via an electrical power bus;
at least one contactor configured to selectively connect the at least one battery or the discharge resistor to the electrical power bus; and
a controller configured to actuate the at least one contactor to selectively connect the at least one battery or the discharge resistor to the electrical power bus, wherein the controller is configured to actuate the at least one contactor to connect the electrical power bus to the discharge resistor in a default mode to discharge electrical energy stored in the at least one module, and wherein the controller is configured to actuate the at least one contactor to connect the electrical power bus to the battery in at least one vehicle operating mode.

13. A discharge system as set forth in claim 12, wherein the at least one contactor includes a first contactor and a second contactor, and wherein the controller is configured to actuate the first contactor and the second contactor to connect the electrical power bus to the discharge resistor in the default mode.

14. A discharge system as set forth in claim 12, wherein at least one contactor includes a single pole double throw switch.

15. A discharge system as set forth in claim 12, wherein at least one contactor includes a multiple throw switch.

16. A discharge system comprising:
a battery;
an electrical power bus selectively connected to the battery;
at least one module electrically coupled to the electrical power bus and configured to receive electrical energy from the battery;
a discharge resistor configured to be selectively coupled to the electrical power bus to dissipate electrical energy stored in the at least one module;
a first contactor operatively disposed between the battery and the electrical power bus and configured to selectively connect the electrical power bus to the battery or the discharge resistor, wherein the first contactor is configured to connect the electrical power bus to the discharge resistor in a default mode to discharge electrical energy stored in the at least one module, and wherein the first contactor is configured to connect the electrical power bus to the battery in at least one vehicle operating mode;
a second contactor operatively disposed between the battery and the electrical power bus and configured to selectively connect the electrical power bus to the battery or the discharge resistor, wherein the second contactor is configured to connect the electrical power bus to the discharge resistor in the default mode and connect the electrical power bus to the battery in at least one vehicle operating mode;
a controller configured to actuate at least one of the first contactor and the second contactor to selectively connect the electrical power bus to the battery or the discharge resistor;
a pre-charge resistor operatively disposed between the battery and the electrical power bus; and
a pre-charge contactor operatively disposed between the battery and the electrical power bus and configured to selectively connect the battery and the electrical power bus to the pre-charge resistor, wherein the controller is configured to actuate the pre-charge contactor.

17. A discharge system as set forth in claim 16, wherein at least one of the first contactor and the second contactor includes a single pole double throw switch.

18. A discharge system as set forth in claim 17, wherein at least one of the first contactor and the second contactor includes a multiple throw switch.

* * * * *